United States Patent [19]

Stevenson

[11] Patent Number: 4,849,582

[45] Date of Patent: Jul. 18, 1989

[54] HEAT SHRINKABLE STRAIN RELIEF DEVICE AND METHOD OF FORMING SAME

[75] Inventor: Lawrence O. Stevenson, Philadelphia, Pa.

[73] Assignee: Bell of Pennsylvania, Conshohocken, Pa.

[21] Appl. No.: 113,742

[22] Filed: Oct. 28, 1987

[51] Int. Cl.[4] .................... H02G 15/007; H02G 3/22; H01R 13/58
[52] U.S. Cl. ........................... 174/135; 156/86; 174/153 G; 174/DIG. 8; 248/56
[58] Field of Search ........... 174/65 R, 65 SS, 65 G, 174/135, 151, 152 G, 153 G, DIG. 8; 439/445, 447, 449, 453, 455, 932; 29/447; 156/84, 85, 86; 248/56

[56] References Cited

U.S. PATENT DOCUMENTS

| | | | |
|---|---|---|---|
| 1,565,321 | 12/1925 | Frantz | 439/447 |
| 3,423,518 | 1/1969 | Weagant | 174/153 G |
| 3,891,790 | 6/1975 | Kierstead | 174/DIG. 8 X |
| 4,006,956 | 2/1977 | Allgaier | 439/455 |
| 4,174,463 | 11/1979 | Albert Jr. | 174/79 |
| 4,524,038 | 6/1985 | Heinemann et al. | 264/61 |
| 4,629,275 | 12/1986 | Maul | 439/449 |
| 4,645,295 | 2/1987 | Pronovost | 350/96.2 |

FOREIGN PATENT DOCUMENTS

| | | | |
|---|---|---|---|
| 745302 | 10/1966 | Canada | 174/DIG. 8 |
| 60-244009 | 12/1985 | Japan | 174/65 R |
| 2171855 | 9/1986 | United Kingdom | 174/65 SS |

Primary Examiner—Laramie E. Askin
Attorney, Agent, or Firm—Lowe, Price, Leblanc, Becker & Shur

[57] ABSTRACT

A heat shrinkable strain relief device protects electrical wires passing through an aperture in a partition and secures the wires to the partition. The strain relief includes a first heat shrunk tube overlying the wires and having a diameter that is no larger than the diameter of the aperture. A second heat shrunk tube overlying a portion of the first heat shrunk tube has an outer diameter greater than that of the aperture. The strain relief is located in the partition with only a length of first heat shrunk tube that extends outward from the second heat shrunk tube passing through the aperture. A third optional heat shrunk tube positioned on the first heat shrunk tube is spaced apart from the second tube by a distance approximately equal to the thickness of the partition. The strain relief device is formed by locating lenghts of heat shrinkable tubing in predetermined positions on the wires, and applying heat.

15 Claims, 3 Drawing Sheets

U.S. Patent   Jul. 18, 1989   Sheet 1 of 3   4,849,582
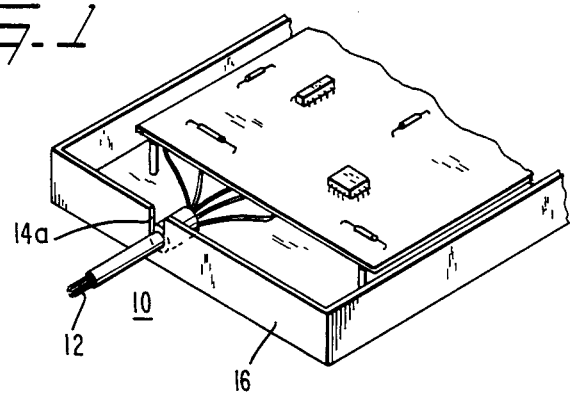
Fig. 1
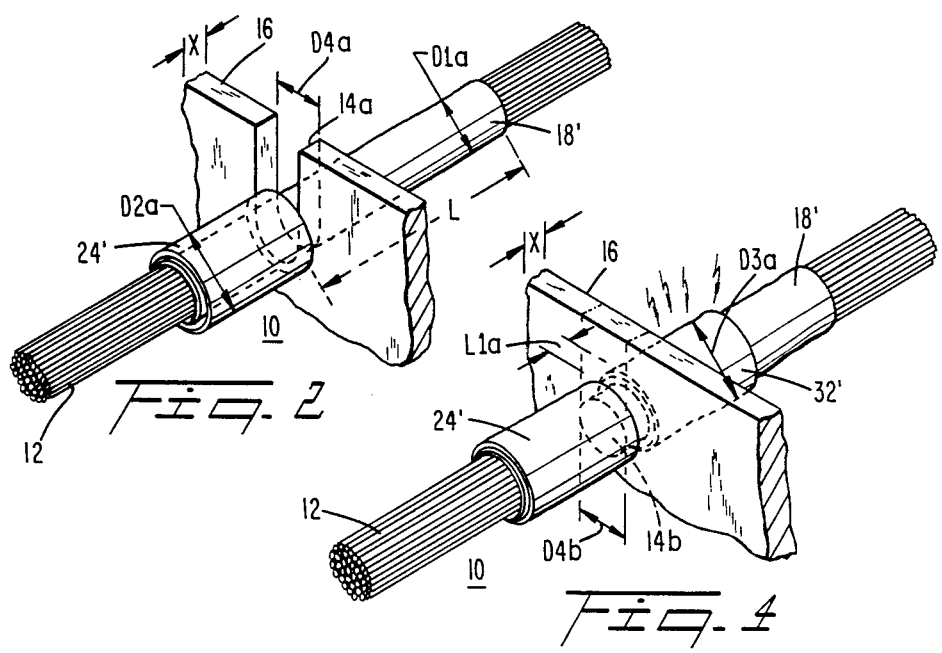
Fig. 2
Fig. 4
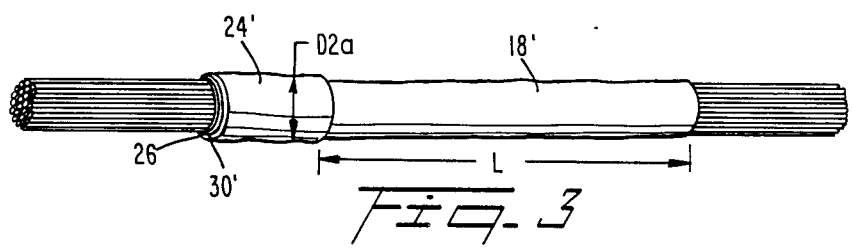
Fig. 3
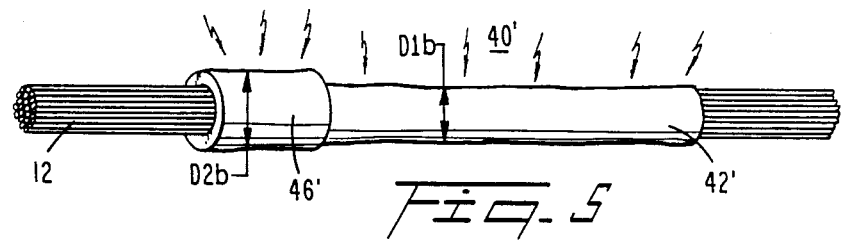
Fig. 5

HEAT SHRINKABLE STRAIN RELIEF DEVICE AND METHOD OF FORMING SAME

TECHNICAL FIELD

This invention is related generally to strain reliefs for electrical wires and more particularly toward and improved electrical wire strain relief formed of heat shrunk tubing and to a method of making it.

BACKGROUND ART

In one type of strain relief known in the prior art, a rubber or plastic grommet is inserted and secured into an aperture in a partition or wall through which at least one wire is inserted and then clamped to the partition or wall. Unfortunately, the wire or wires tend to be subjected to crushing and resultant damage caused by clamping. Additionally, the clamp does not conform well to a variety of wire shapes or wire bundle configurations, requiring specialized hardware instead.

Another type of strain relief includes a collar placed over a wire, with a portion or associated part of the collar being crimped to secure the collar onto the wire. The collar is then inserted into the aperture of a partition and secured therein, thereby retaining the wire into and through the aperture.

Other strain reliefs include a collar through which the wire is inserted, held in place by a tight or compressive fit between the collar and wire. As a result, insertion of the wire into and through the collar can damage the wire. Further, it can be difficult to locate the collar along the wire except near an end of the wire due to the forces required to move the collar into position.

Alternatively, the collar initially can be provided with an inner diameter sufficiently large to allow easy positioning and placement of the collar onto the wire. In this case, the collar can thereafter be compressed onto the wire using a clamp or by providing a taper such that the collar is compressed upon insertion of the collar into the aperture. The clamp or aperture, therefore, must have a specific shape and size to provide the necessary compressive forces sufficient to hold the collar onto the wire without damaging the wire. Therefore, this technique does not readily accommodate various wire sizes, shapes, and bundle configurations without the requirement of a modification to the hardware in each situation. Slight variations due to wire irregularities or wire positioning within a bundle or cable could affect strain relief performance.

Because prior art strain reliefs utilize preformed collar and clamps, they are not readily adaptable to varying wire sizes, shapes, and bundle configurations. Further, these strain reliefs can required the wire to be protected to be forcibly inserted into and through a tight fitting, compressive collar prior to insertion through an aperture. The insertion force required to install the strain relief can itself damage the wire. In addition, wires within a conventional strain relief are exposed to environmental contamination.

A need therefore exists to provide a strain relief which can be easily installed and positioned on a wire to be protected without damaging the wire. Further, a need exits for a strain relief which is readily adaptable to various wire sizes, shapes and wire bundle configurations.

Accordingly, one object of the invention is to provide an easily installed and positioned strain relief for at least one wire passing through an aperture in a partition.

Another object of the invention is to provide a strain relief which is adaptable to various wire sizes, shapes and wire bundle configurations.

Still another object of the invention is to provide a strain relief which can be secured onto a wire or wires to be protected without causing damage thereto.

A further object of the invention is to provide a wire strain relief which can be secured into position without pinching underlying wire or wires.

Still another object of the invention is to provide a strain relief which prevents wire movement axially in both directions through an aperture in a partition.

Another object of the invention is to provide a strain relief which accommodates injection of a caulking compound to fill interspaces between and among the wire or wires and the strain relief to provide an environmental barrier.

BRIEF DESCRIPTION OF THE INVENTION

In accordance with one aspect of the invention, a strain relief for at least one wire passing through an aperture in a partition includes a first heat shrunk tube overlying the wire and having an outer diameter no larger than a diameter of a portion of the aperture receiving the strain relief. A second heat shrunk tube overlies a portion of the first heat shrunk tube, with a length of the first heat shrunk tube extending outward from the second heat shrunk tube. The second heat shrunk tube has an outer diameter greater than the diameter of the aperture so that the strain relief is locatable in the partition with only the length of the first heat shrunk tube extending through the aperture.

In accordance with another aspect of the invention, the strain relief includes an intermediate heat shrunk tube on the first heat shrunk tube, beneath and substantially coextensive with the second heat shrunk tube.

In accordance with still another aspect of the invention, a third heat shrunk tube, overlies the first heat shrunk tube and has an outer diameter greater than the diameter of the aperture. This third heat shrunk tube is longitudinally spaced apart from the second heat shrunk tube on the first heat shrunk tube by a distance substantially equal to a thickness of the partition at the aperture. Accordingly, intermediate heat shrunk tubes can be included on the first heat shrunk tube, beneath and substantially coextensive with each of the second and third heat shrunk tubes, respectively.

In accordance with a further aspect of the invention, a material such as a silicone based caulking compound is provided for filling voids in the first heat shrunk tube.

The strain relief can be used with various shaped apertures, including an open ended aperture, allowing the wire and strain relief assembly to be fully assembled an slipped into place through the open end of the aperture.

In accordance with another aspect of the invention, a strain relief for at least one wire passing through an aperture in a partition includes a first heat shrunk tube having an elongated, aperture insertion portion with an outer diameter no larger than a diameter of the aperture. A collar portion of the relief has an outer diameter greater than the diameter of the aperture, and is joined to and extends from the aperture insertion portion. To relieve wire strain in a second direction, a second heat shrink tube with an outer diameter greater than the diameter of the aperture overlies the first heat shrink tube. The second heat shrink tube is longitudinally spaced apart from the collar portion on the first heat shrunk tube by a distance substantially equal to a thickness of the partition.

The collar portion is made integral with the aperture insertion portion, or can extend axially or radially from the aperture insertion portion.

In accordance with a further aspect of the invention, a method for forming a strain relief for at least one wire passing through an aperture in a partition includes locating a first length of tubing formed of a heat shrinkable material on the wire. Heat is then applied to the first length of tubing to shrink the tubing on the wire so that the outer diameter of the first length of tubing is no larger than a diameter of the aperture. A second, shorter length of heat shrinkable tubing is located on the first length of tubing. Heat is applied to the second length of tubing to shrink the tubing on the first length so that the second length of tubing becomes secured to the first length of tubing. The second length of tubing is secured so that it has an outer diameter greater than the diameter of the aperture following shrinking.

Another aspect of the method further includes passing the wire and the first length of tubing through the partition aperture until the second length of tubing abuts one side of the partition. A third length of heat shrinkable tubing, approximately equal to the second length of tubing, is located on the first length so that the third length of tubing abuts the opposite side of the partition. Heat is applied to the third length of tubing to shrink the tubing on the first length, securing the third length of tubing to the first length of tubing. Following shrinking, the third length of tubing has an outer diameter greater than the diameter of the aperture.

In accordance with a further aspect of the method, a caulking compound is injected into the first length of tubing prior to applying heat to the first length of tubing to fill voids in the first length of tubing.

In accordance with another aspect of the invention, a strain relief is formed by locating on a wire a first length of tubing including an elongated, aperture insertion tubing portion made of a heat shrinkable material, and a collar portion joined to and extending from the aperture insertion portion and having an outer diameter greater than the diameter of the aperture. Heat is applied to the aperture insertion tubing portion to shrink the tubing on the wire so that the outer diameter of the aperture insertion tubing portion is no larger than the diameter of the aperture. The wire and the aperture insertion portion are passed through the aperture until the collar portion of the first length of tubing abuts one side of the partition. A second length of tubing formed of a heat shrinkable material is located on the aperture insertion portion so that the second length of tubing abuts the opposite side of the partition. Heat is applied to the second length of tubing to shrink the tubing on the aperture insertion portion so that the second length of tubing is secured to the aperture insertion portion. Following shrinking, the second length of tubing has an outer diameter greater than the diameter of the aperture. A caulking compound can be injected into the first length of tubing prior to application of heat to the aperture insertion portion.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 1 is an overview showing how wires entering a circuit board mounting enclosure are retained in place with a strain relief formed in accordance with the invention.

FIG. 2 is a perspective view of a preferred embodiment of the invention used with a partition having an open-ended aperture.

FIG. 3 is a perspective view of another preferred embodiment of invention.

FIG. 4 is a perspective view of another preferred embodiment of the invention including a third heat shrunk tube and used with a partition having a circular aperture.

FIG. 5 is a perspective view of a further embodiment of the invention including preformed collar and aperture insertion portions.

BEST MODE FOR PRACTICING THE INVENTION

Figure 6A:
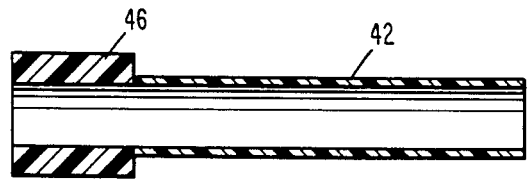
FIGS. 6a-6c are perspective views of alternative collar constructions.

Referring to FIG. 1, a strain relief according to the invention protects wires passing through an enclosure housing an electronic device. Therein, a wire bundle 12 is protected by strain relief 10 at aperture 14a of enclosure 16 forming a partition having a slotted or open-ended aperture 14a. However, aperture 14a may instead be circular without an open end. As shown in FIG. 2, a strain relief 10 comprises a first heat shrunk tube 18' covering wire bundle 12 and having an outer diameter D1a no larger than a diameter of that portion of an aperture which receives the strain relief. A second heat shrunk tube 24' overlies a portion of the first heat shrunk tube 18' such that a length L of the first heat shrunk tube 18' extends outward from the second heat shrunk tube 24'. The second heat shrunk tube 24' has an outer diameter D2a which is greater than the diameter of the aperture receiving the tube. This configuration locates strain relief 10 in a partition with second heat shrunk tube 24' abutting one side of the partition as in FIG. 1. The portion of first heat shrunk tube 18' extending outward from second heat shrunk tube 24' passes through the aperture.

Each heat shrinkable tubing is formed of a conventional, heat sensitive material which shrinks in diameter in response to applied heat. One such commercially available heat shrinkable tubing is Fit ® Shrinkable Tubing made by Alpha Wire Corporation of Elizabeth, N.J. These materials are commonly used to insulate electric wires.

Strain relief 10 may further include an intermediate heat shrunk tube 30' on the first heat shrunk tube 18', as shown in FIG. 3. Intermediate heat shrunk tube 30' is located within and substantially coextensive with second heat shrunk tube 24'.

With reference again to FIG. 2, strain relief 10 is located in an open-ended aperture 14a within partition 16 having a diameter D4a. First heat shrunk tube 18' has an outer diameter D1a no larger than diameter D4a of the portion of aperture 14a which receives strain relief 10. In contrast, second heat shrunk tube 24' has an outer diameter D2a which is greater than the diameter D4a of aperture 14a and is located such that second heat shrunk tube 24' abuts one side of partition 16.

As shown in FIG. 4, strain relief 10 may further include a third heat shrunk tube 32' overlying the first heat shrunk tube 18' to prevent pulling of wire bundle 12 through the aperture in a direction opposite tube 24'. The third heat shrunk tube 32' has an outer diameter D3a which is greater than diameter D4b of aperture 14b. Further, third heat shrunk tube 32' is longitudinally spaced apart from second heat shrunk tube 24' on first heat shrunk tube 18' by distance L1a which is substantially equal to a thickness X of partition 16 at aperture 14b.

Figure 6B:
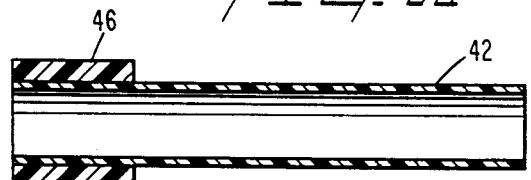
Figure 6C:
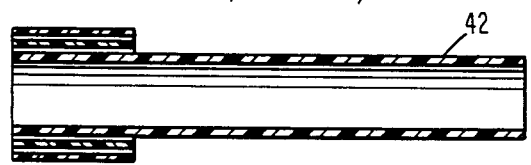

Another embodiment of the invention is shown in FIG. 5 wherein a strain relief if preformed of a first heat shrunk tube 40' having an elongated, aperture insertion portion 42' and a collar portion 46'. Aperture insertion portion 42' has an outer diameter D1b which is no larger than a diameter of the aperture, and a collar portion 46' which has an outer diameter D2a which is greater than the diameter of the aperture. Collar portion 46' is joined to and extends from aperture insertion portion 42'. In this embodiment, collar portion 46' may be integral with aperture insertion 42' or may extend axially from aperture insertion portion 42 as shown in FIG. 6a. Alternatively, the collar portion 46 may be coextensive with and extend radially from a section of aperture insertion portion 42 as shown in FIG. 6b. In the embodiment of FIG. 6c, collar portion 46 includes several layers of heat shrinkable material extending radially from a section of aperture insertion portion 42.

Figure 7A:
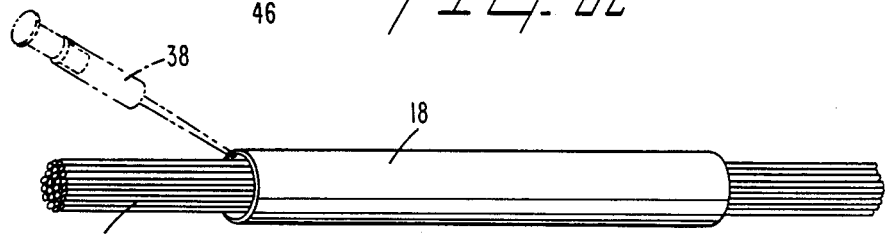
FIGS. 7a-7f illustrate a method of forming a strain relief in accordance with the invention.
Figure 7B:
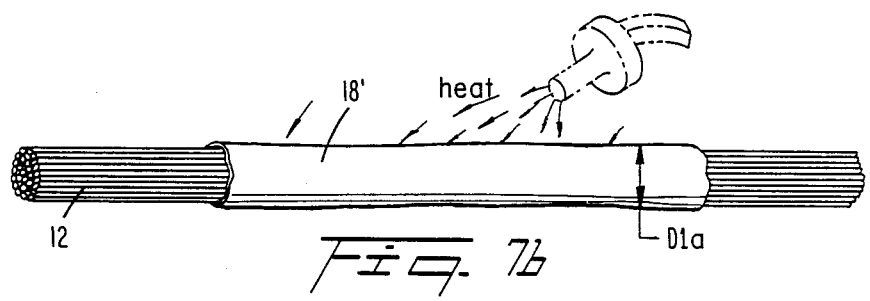
Figure 7C:
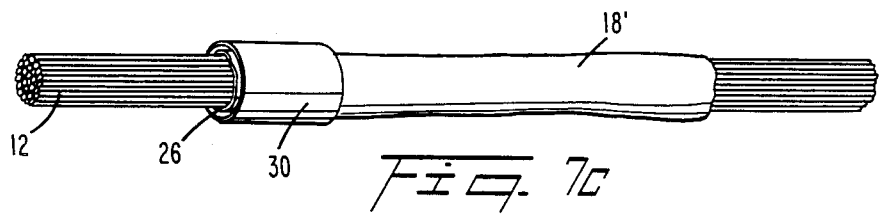
Figure 7D:
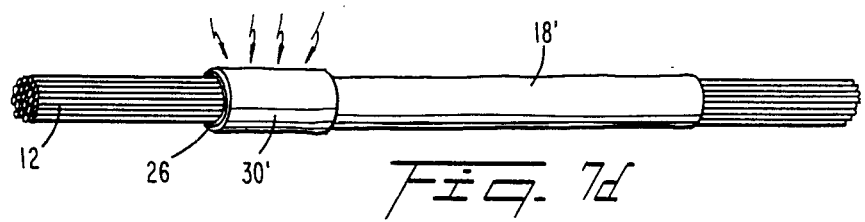
Figure 7E:
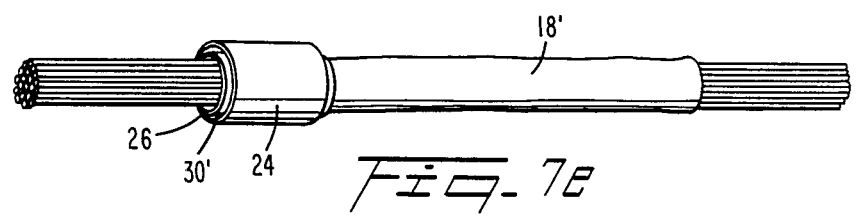
Figure 7F:
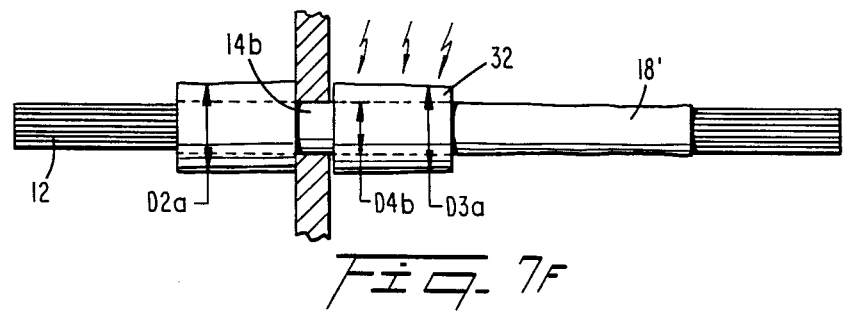

With reference to FIG. 7a through 7e, a method of forming a strain relief for one or more wires passing through an aperture in a partition comprises first locating a first length of tubing 18 formed of heat shrinkable material on the wire bundle 12 (FIG. 7a). Optionally, using a suitable device 38, a silicone based caulking compound 26 is injected into tubing 18 surrounding the bundle 12 to fill voids therein and create an environmental barrier. In FIG. 7b heat is applied to first length of tubing 18 to shrink the tubing on the wire, resulting in heat shrunk tube 18' which has an outer diameter no larger than a diameter of the aperture. If multiple layers of heat shrinkable tubing are to be used to build up a collar portion, then intermediate heat shrinkable tube 30, shorter than first length of tubing 18', is located on first length of shrunk tubing 18' as shown in FIG. 7c. Heat is now applied to the intermediate heat shrinkable tubing 30 to form an intermediate heat shrunk tube 30' which is secured to first length of tubing 18'. After any intermediate layers are added, shrunk and secured onto first length of tubing 18', a second length of tubing 24 is located on the first length of tubing 18' surrounding the intermediate heat shrunk tube 30' as shown in FIG. 7e. Finally, heat is applied to the second length of tubing 24 to shrink it (the heat shrunk second length being designated 24') onto the intermediate tubing 30' to form a strain relief in accordance with the invention, as shown in FIG. 3.

To form the strain relief 10 of FIG. 4, with the third length of tubing 32' spaced from second length 24', following the steps of FIGS. 7a-7e, wire bundle 12 and first length of tubing 18' are passed through aperture 14b until the second length of tubing 24' abuts one side of partition 16. The third length of heat shrinkable tubing 32 is then located on the first length of tubing 18, positioned so that it abuts the opposite side of partition 16. Heat is then applied to third length of tubing 32 to shrink the tubing on the first length 18 so that the third length, following shrinking (32'), is secured on the first length but has an outer diameter greater than diameter D4b of aperture 14b.

Figure 8:
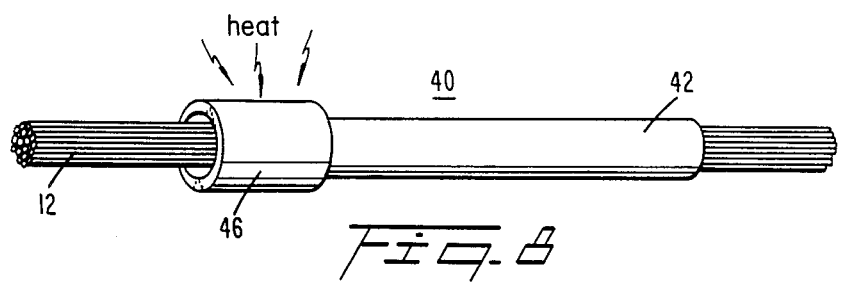
FIG. 8 is a view showing placement of a first length of tubing on a wire bundle prior to application of heat.

Referring to FIG. 8, an alternative method of forming a strain relief wherein a first length of tubing 40 located on wire bundle 12 includes an elongated aperture insertion tubing portion 42 made of a heat shrinkable material and a collar portion 46 having an outer diameter greater than the diameter of the aperture preformed to and extending from aperture insertion portion 42. Heat is applied to aperture insertion tubing portion 42 to shrink the tubing on wire bundle 12 so that the outer diameter of the shrunk aperture insertion tubing portion 42' is not larger than the diameter of the aperture as shown in FIG. 5. Wire bundle 12 and aperture insertion tubing portion 42' are then passed through the aperture until collar portion 46 of first length of tubing 40 abuts one side of the partition. A second length of tubing is then located on aperture insertion tubing portion 42' so that the tubing abuts the opposite side of the partition. The second length of tubing, also formed of heat shrinkable material, is heated to shrink the tubing on the aperture insertion portion 42' until it is secured to aperture insertion portion 42' but has an outer diameter greater than the diameter of the aperture.

Accordingly, there have been described various embodiments of a strain relief, formed of lengths of heat shrinkable tubing, adapted to slip over wire bundles that pass through partition apertures. As is apparent, the strain relief so formed is inexpensive, readily adaptable to various wire sizes, shapes and bundle configurations, is easy to apply and manipulate and provides excellent protection to the underlying wires.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

I claim:
1. A strain relief, assembly comprising:
a wire;
a partition having an aperture therethrough;
a first heat shrunk tube overlying the wire and having an outer diameter no larger than a diameter of said aperture;
a second heat shrunk tube overlying a portion of said first heat shrunk tube with a length of said first heat shrunk tube extending outward from said second heat shrunk tube, said second heat shrunk tube having an outer diameter greater than said diameter of said aperture,
said wire extending through said partition with only said length of said first heat shrunk tube extending through said aperture and with said second heat shrunk tube abutting one side of said partition; and a third heat shrunk tube abutting the opposite side of said partition and overlying said first heat shrunk tube, said third heat shrunk tube having an outer diameter greater than said diameter of said aperture and being longitudinally spaced apart from said second heat shrunk tube on said first heat shrunk tube on said opposite side of said partition by a distance substantially equal to a thickness of said partition at said aperture.

2. The strain relief assembly of claim 1, further including an intermediate heat shrunk tube on said first heat shrunk tube, beneath and substantially coextensive with said second heat shrunk tube.

3. The strain relief assembly of claim 1, further including at least one intermediate heat shrunk tube on said first heat shrunk tube, beneath and substantially coextensive with each of said second and third heat shrunk tubes, respectively.

4. The strain relief assembly of claim 1 further comprising means for filling voids in a portion of said wire inside said first heat shrunk tube.

5. The strain relief assembly of claim 4, wherein said filling means comprises a silicone based caulking compound.

6. The strain relief assembly of claim 1 wherein said aperture is open ended.

7. A strain relief, assembly comprising:
a wire;
a partition having an aperture therethrough;
a first heat shrunk tube having an elongated, aperture insertion portion positioned in said partition aperture, said first heat shrunk tube having an outer diameter no larger than a diameter of said aperture, and a collar portion abutting one side of said partition with an outer diameter greater than said diameter of said aperture, joined to and extending from said aperture insertion portion; and
a second heat shrunk tube abutting the other side of said partition with an outer diameter greater than said diameter of said aperture, said second heat shrunk tube overlying said aperture insertion portion of said first heat shrunk tube and longitudinally spaced apart on said first heat shrunk tube from said collar portion on the other side of said partition by a distance substantially equal to a thickness of said partition.

8. The strain relief assembly of claim 7, wherein said collar portion extends axially from said aperture insertion portion.

9. The strain relief assembly of claim 7, wherein said collar portion is coextensive with and extends radially from a section of said aperture insertion portion.

10. The strain relief assembly of claim 7, wherein said collar portion is integral with said aperture insertion portion.

11. The strain relief assembly of claim 7, wherein said aperture is open ended.

12. A method of forming a strain relief for at least one wire passing through an aperture in a partition, comprising the steps of:
locating on said wire a first length of tubing formed of a heat shrinkable material;
applying heat to said first length of tubing to shrink said first length of tubing on said wire so that the outer diameter of said first length of tubing is no larger than a diameter of said aperture;
locating on said first length of tubing a second length of tubing shorter than said first length of tubing and formed of the heat shrinkable material;
applying heat to said second length of tubing to shrink said second length of tubing on said first length of tubing so that said second length of tubing is secured to said first length of tubing, said second length of tubing, following shrinking thereof, having an outer diameter greater than the diameter of said aperture;
passing said wire and said first length of tubing through said aperture until said second length of tubing abuts one side of said partition;
locating on said first length of tubing a third length of tubing approximately equal in length to the length of said second length of tubing and formed of said heat shrinkable material so that said third length of tubing abuts the opposite side of said partition; and
applying heat to said third length of tubing to shrink said third length of tubing on said first length of tubing so that said third length of tubing is secured to said first length of tubing, said third length of tubing, following shrinking thereof, having an outer diameter greater than the diameter of said aperture.

13. The method of claim 12, further comprising the step of injecting a caulking compound into said first length of tubing prior to said step of applying heat to said first length of tubing.

14. A method of forming a strain relief for at least one wire passing through an aperture in a partition, comprising the steps of:
locating on said wire a first length of tubing comprising an elongated, aperture insertion tubing portion made of a heat shrinkable material and a collar portion joined to and extending from said aperture insertion portion and having an outer diameter greater than the diameter of said aperture;
applying heat to said aperture insertion tubing portion to shrink said aperture insertion tubing portion on said wire so that the outer diameter of said aperture insertion tubing portion is no larger than the diameter of said aperture;
passing said wire and said aperture insertion tubing portion through said aperture until said collar portion of said first length of tubing abuts one side of said partition;
locating on said aperture insertion tubing portion a second length of tubing formed of said heat shrinkable material so that said second length of tubing abuts the opposite side of said partition; and
applying heat to said second length of tubing to shrink said second length of tubing on said aperture insertion tubing portion so that said second length of tubing is secured to said aperture insertion tubing portion, said second length of tubing, following shrinking thereof, having an outer diameter greater than the diameter of said aperture.

15. The method of claim 14, further comprising the step of injecting a caulking compound into said first length of tubing prior to said step of applying heat to said aperture insertion tubing portion.

* * * * *